Nov. 5, 1968  E. W. PIPHER ET AL  3,409,776
ADAPTER FOR WELLS OF SCINTILLATION COUNTERS TO PERMIT
DIRECT MEASUREMENT OF HIGH LEVELS OF RADIOACTIVITY
Filed May 3, 1965

Inventors:
Edward W. Pipher
William P. Krasty

By Gildo E. Fato
Atty.

United States Patent Office 3,409,776
Patented Nov. 5, 1968

3,409,776
ADAPTER FOR WELLS OF SCINTILLA-
TION COUNTERS TO PERMIT DIRECT
MEASUREMENT OF HIGH LEVELS OF
RADIOACTIVITY
Edward W. Pipher, Detroit, Mich., and William P. Grasty,
Zion, Ill., assignors to Abbott Laboratories, Chicago,
Ill., a corporation of Illinois
Filed May 3, 1965, Ser. No. 452,551
4 Claims. (Cl. 250—106)

ABSTRACT OF THE DISCLOSURE

An adapter for wells of scintillation counters arranged to hold a source of radioactivity above the well of scintillation counters and having a plug capable of fitting snugly within the opening of the well. The adapter increases the distance of the source from the well and provides shielding to decrease the radioactivity enough to permit measurement in standard well counters and additionally provides a defined geometry so that reproducible measurements can be made.

---

This invention relates to the measurement of radiation and particularly to well adapters for use in scintillation well counters.

One of the most suitable and accurate methods of determining the blood volume of a living patient is to inject a predetermined amount of radioactivity into the veins of a patient and then later determine the amount of radioactivity in a specific volume of the patient's blood. Knowing the initial radioactivity injected into the patient and the amount of radioactivity in a specific volume of blood, the total volume of blood in the patient's system can be calculated. This information can be vital to a patient who has undergone surgery.

Normally, the radioactive solutions for blood volume determinations are contained in syringes for injection into the patient. The syringes are commercially available in sets of five or six, each syringe containing the same amount of radioactivity within specified limits. While equipment designed exclusively for blood volume determinations is available, such equipment is expensive and limited in use. Consequently, it is desirable to utilize standard scintillation well counters for this purpose. In doing so, the problem arises in that the initial radioactivity contained in the syringes cannot be determined by placing the syringes directly in scintillation well counters since they contain too much radioactivity for a well counter to measure. After the solution is injected into a patient, the radioactivity is diluted considerably so that the final measurement to be made is of relatively low radioactivity. In order to determine the initial radioactivity contained in the syringes, utilizing a standard scintillation well counter, it is common practice to accurately dilute the solution in one of the syringes from the set to enable a measurement to be made in a well counter. The total amount of radioactivity contained in the syringe is then determined by calculation. Since the amount of radioactivity in each of the syringes in a set is substantially the same, the measurement of initial radioactivity in one of the syringes is utilized in conjunction with the remaining syringes in determining blood volume. This procedure wastes one syringe from the set, introduces the possibility of error because of the necessity for dilution and requires the expenditure of time when a new set of syringes is to be used.

The present invention provides an adapter for standard scintillation well counters which permits the direct measurement of high levels of radioactivity, thereby eliminating the need for the noted dilution procedure with the attendant disadvantages.

The means of achieving the foregoing and other advantages of the present invention will be readily understood by reference to the following detailed description when considered in conjunction with the accompanying drawing, in which.

Figure 1:
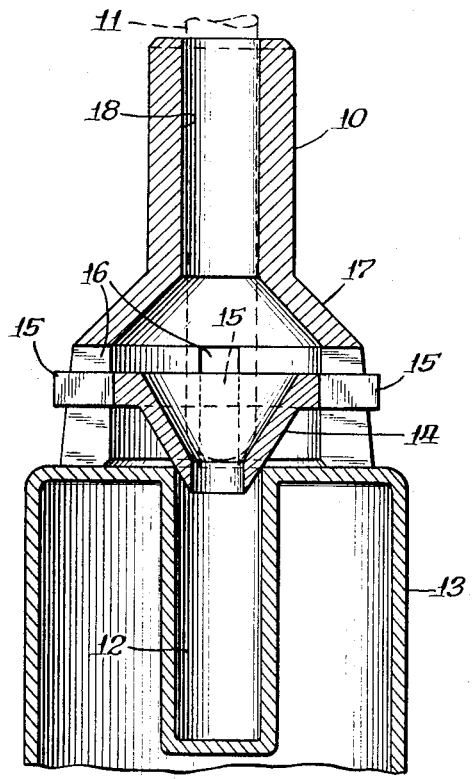
FIGURE 1 is an elevational view in cross-section of a device embodying the present invention and shown in place on the well of a scintillation counter.

In the invention illustrated in the foregoing figures, the adapter, generally indicated at 10, is composed of a radioactive shielding material; for example, a composition of lead oxide and polyethylene, with about nine parts by weight of lead oxide and about one part by weight of polyethylene. Normally, the syringe or tube 11 would be placed directly into the well 12 of the scintillation counter 13. High levels of radioactivity cannot be measured directly in this manner, however. The adapter 10, by increasing the distance of the syringe 11 from the well 12 of the scintillation counter 13 and by shielding the radioactivity, thereby decreases the radioactivity enough to permit measurement in standard well counters. The adapter 10 also provides a defined geometry so that reproducible measurements can be made. In effect, the adapter 10 provides means for employing reproducible geometric dilution in the measurement of the activity of a specimen. In conjunction with the well of a specific scintillation counter, the adapter of the present invention maintains the collimation, i.e., the field of view of the detector or well. Thus, the adapter provides reproducible geometric dilution by means of absorption of a portion of the radioactivity and by maintaining a constant collimation or field of view which the detector or well has of the specimen being measured. A cone-shaped plug 14 having projections 15 extending therefrom permits the adapter 10 to be utilized with well counters having various diameter wells. The projections 15 extending from the plug 14 are slidable within the slots 16 of the base portion 17 of the adapter 10. The plug 14 can thus be adjusted to snugly fit the various sized openings of different well counters. While the plug 14 has been shown to be coaxial with the cylindrical opening 18 of the adapter 10, this is not absolutely necessary. It is necessary only that the angular field of view of the detector or well be maintained. In use, the base portion 17 of the adapter 10 is positioned over the well 12 of a scintillation counter 13. The cone-shaped plug 14 is then slidably adjusted to snugly fit the opening of the well 12, as shown in FIGURE 1. A syringe 11 or other container having a radioactive solution therein can then be placed within the cylindrical opening 18 of the adapter 10 and the radioactivity measured directly.

Figure 3:
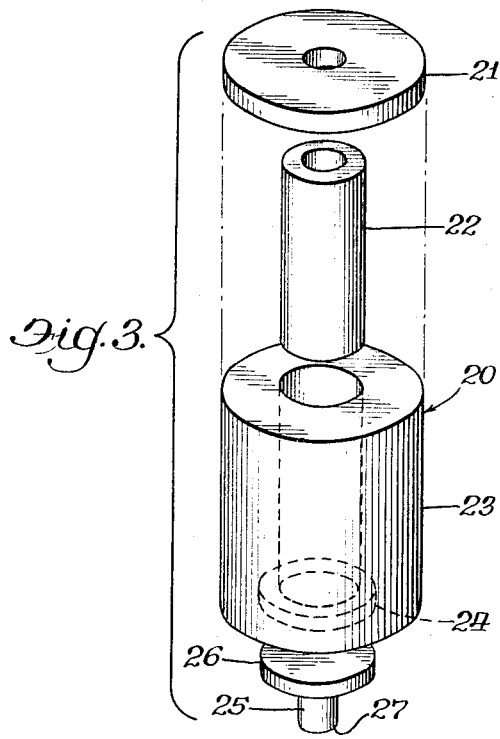
FIGURE 3 is a perspective view of a separate embodiment of the present invention and shown in exploded form.
Figure 4:
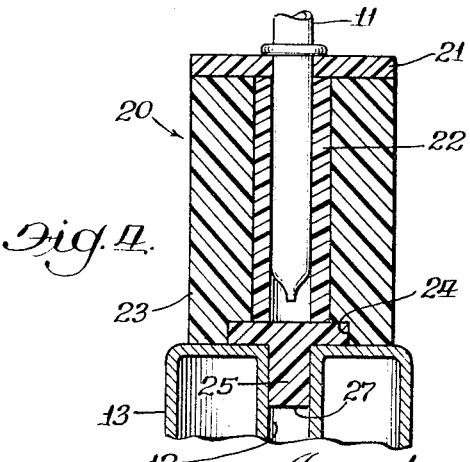
FIGURE 4 is an elevational view in cross-section of the embodiment of FIGURE 3 shown in place on the well of a scintillation counter.

In FIGURES 3 and 4 there is illustrated a separate embodiment of the present invention. The adapter 20 of this embodiment is composed of a disk 21 and a cylinder 22 made of lead or other suitable radioactive absorbing material, the disk 21 and cylinder 22 having centrally-located concentric openings therein. A suitable composition for casting would be 94% lead, 4% tin, and 2% antimony. The disk 21 and cylinder 22 are assembled together with a plastic material, for example, an epoxy resin, thereby forming an outer cylindrical portion 23. The cylinder 23 is formed with a disk-like opening 24 in the bottom thereof. The opening 24 is coaxial with the lead cylinder 22 and of a larger diameter. An absorbing plug 25, made of a suitable plastic material, maintains concentricity of the adapter 20 to the well 12 of the scintillation counter 13. The absorbing plug 25 has a disk-portion 26 which is adapted to fit the opening 24 of the plastic, cylindrical portion 23 of the adapter 20. Depending from the center of the disk-portion 26 of the plug 25 is a cylindrical portion 27 which fits into the well 12 of a scintillation counter. The diameter of the cylindrical portion 27 is adapted to fit a particular well. To make the adapter 20 interchangeable with regard to wells of differing diameter, different absorbing plugs 25 can be utilized. Several plugs having the same size disk-portion 26 are employed, each plug having a depending cylindrical portion 27 of different diameter. Thus, each plug will fit the opening 24 in the plastic cylinder 23 while at the same time being adapted for a particular size well. If it is desired to employ the same adapter 20 with scintillation counters having different well diameters, it is necessary only to change the absorbing plug 25.

Figure 2:
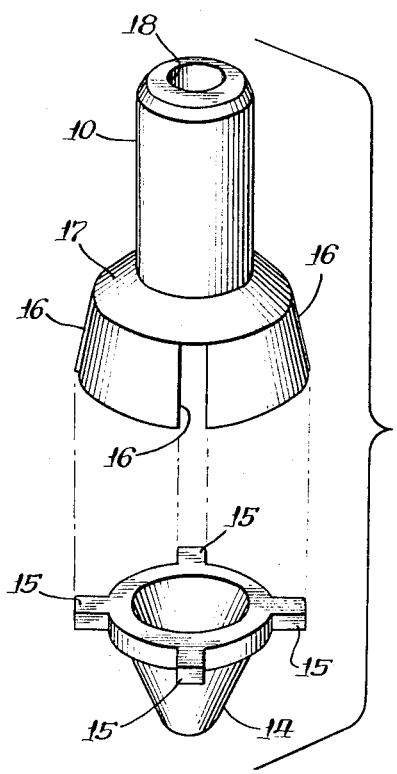
FIGURE 2 is a perspective view of a device embodying the present invention and shown in exploded form.

In use, an experimentally determined factor must be utilized when employing the adapter of the present invention, since measurements of radioactive solution are made with the syringe or other container in place above the well of the scintillation counter rather than within the well. Since each adapter defines a fixed counting geometry, the factor need only be determined once for each particular adapter and well. The method of employing an adapter of the present invention will be described with reference to the adapter illustrated in FIGURES 1 and 2 although the embodiment illustrated in FIGURES 3 and 4 can be employed in a similar fashion.

The adapter 10 is placed on top of the well 12 of a scintillation counter 13, the base portion 17 resting on the surface of the counter. The cone-shaped plug 14 is then adjusted by sliding the projections 15 within the slots 16 until the plug 14 fits snugly within the opening of the well 12, as illustrated in FIGURE 1. A syringe 11 or other container having the radioactive solution therein is placed within the cylindrical opening 18 of the adapter 10 and the radioactivity is measured in counts per minute. The entire contents of the syringe 11 are then expressed into a 2000 ml. volumetric flask containing about 1500 ml. of water. The flask is then filled to exactly 2000 ml. and the solution is mixed thoroughly. The empty syringe 11 is reinserted into the adapter 10 and the radioactivity thereof is measured. The radioactivity of the syringe contents, as measured in the adapter, is determined by subtracting the measurement of the empty syringe from the measurement of the full syringe.

The adapter 10 is removed from the well 12 and the background activity is determined in counts per minute. Five milliliter samples of the dilute solution, prepared as previously described, are pipetted into identical test tubes. The test tubes should be of the same type and volume as will be used in determinations of blood or plasma volume. The radioactivity of each sample is determined in counts per minute. The background count, previously determined, is subtracted from each sample and the arithmetic mean of the measurements is calculated. Knowing the radioactivity of 5 ml. of the dilute solution, the radioactivity of the full 2000 ml., i.e., the radioactivity of the contents of the syringe, can be calculated.

The counting factor for the particular adapter is determined by dividing the activity of the syringe contents, as determined by the dilution method, by the activity of the syringe contents as measured in the adapter. Once the counting factor for a particular adapter is determined, dilution of the syringe contents so that a measurement can be made directly in the well of a scintillation counter is no longer necessary.

The following examples are illustrative of the present invention and are presented to illustrate the use of an adapter.

*Example I*

The counting factor for an adapter, determined by the method previously described, is illustrated as follows:

(1) Activity of a full syringe taken from a set as measured in an adapter: 23,465 counts per minute.

(2) Activity of the empty syringe as measured in the adapter: 1934 counts per minute.

(3) Activity of the syringe contents as measured in the adapter: 23,465 c.p.m.−1934 c.p.m.=21,531 c.p.m.

(4) Background activity of the well with the adapter removed: 1242 c.p.m.

(5) Average activity of two 5 ml. samples of the contents of the syringe, diluted as previously described, and measured directly in the well of the scintillation counter: 6493 c.p.m. Less background activity of the well without adapter: 6493 c.p.m.−1242 c.p.m.=5251 c.p.m.

(6) Activity of 2000 ml. of the solution as measured directly in the well (actual activity of the syringe contents):

$$5251 \text{ c.p.m.} \times \frac{2000 \text{ ml.}}{5 \text{ ml.}} = 2,100,400 \text{ c.p.m.}$$

(7) Counting factor of the adapter:

$$\frac{\text{activity measured in the well}}{\text{activity measured in the adapter}} = \frac{2,100,400 \text{ c.p.m.}}{21,531 \text{ c.p.m.}} = 97.6$$

Counting factor determined on repetition of above steps: 98.7.

Average counting factor:

$$\frac{97.6 + 98.7}{2} = 98.1$$

*Example II*

Knowing the counting factor for the particular adapter, the blood volume of a patient was determined in the following fashion:

A syringe of radio-iodinated $I^{131}$, providing 5 microcuries in approximately 1.5 ml. sterile, pyrogen-free solution and 10 mg. serum albumin per ml. is injected into a patient after first determining the activity of the full syringe as measured in the adapter.

Activity of full syringe as measured in adapter: 16,040 c.p.m.
Activity of empty syringe as measured in adapter: 544 c.p.m.
Activity of dose injected as measured in adapter: 15,496 c.p.m.

Actual activity of dose injected:
Counting factor×dose injected as measured in adapter:

$$98.1 \times 15,496 \text{ c.p.m.} = 1,520,623 \text{ c.p.m.}$$

Average activity of two 5 ml. blood samples measured directly in the well after injection of the radio-iodinated $I^{131}$:
1490 c.p.m./5 ml. or 298 c.p.m./1 ml.
Blood volume:

$$\frac{1,520,623 \text{ c.p.m.}}{298 \text{ c.p.m./1 ml.}} = 5189 \text{ ml.}$$

*Example III*

The activity of the contents of five syringes containing radio-iodinated $I^{131}$ was measured in an adapter of the present invention. The contents of each syringe was then diluted volumetrically to the volumes indicated. The volumes were then determined using the procedure of Example II. Duplicate 5 ml. portions were taken from the volumetric dilutions and the activity measured directly in the well of a scintillation counter. The volume was then calculated by the method of Example II.

| Actual volume | Determined volume |
|---|---|
| 1000 ml. | 1007 ml. |
| 2000 ml. | 1979 ml. |
| 3000 ml. | 2968 ml. |
| 4000 ml. | 3984 ml. |
| 5000 ml. | 4969 ml. |

It is not desired to be limited to the exact details described, for obvious modifications will occur to a person skilled in the art. All such practice of the invention is considered to be a part hereof provided it falls within the scope of the appended claims.

What is claimed is:

1. An adapter for the well of a scintillation well counter comprising: a generally cylindrical member composed of radiation shielding material, said member having a cylindrical opening extending therethrough coaxial with a vertical axis through the center of said cylindrical member for removably holding a container of radioactive material; a hollow, enlarged base portion also composed of radiation shielding material and integral with said cylindrical member, said base portion arranged for resting on the surface of a scintillation counter above the well thereof and having a plurality of spaced, vertically-positioned slots therein; and a hollow, generally cone-shaped plug composed of radiation shielding material having horizontal projections extending from the base thereof and having an opening in the apex thereof, said projections slidably receivable in the slots in the base portion of the cylindrical member permitting the cone-shaped plug to be slidably adjusted to snugly fit various sized wells of scintillation counters, the adapter providing a defined geometry above the well of the scintillation counter for measurement therein of the activity of radioactive material.

2. An adapter in accordance with claim 1 in which the cylindrical member, base portion, and cone-shaped plug are composed of a radiation shielding material comprising a composition of lead oxide and polyethylene of about nine parts by weight of lead oxide and about one part by weight of polyethylene.

3. An adapter for the well of a scintillation well counter comprising: a generally cylindrical member composed of radiation shielding material, said member having a cylindrical opening formed therein and extending therethrough coaxial with a vertical axis through the center of said cylindrical member for removably holding a container of radioactive material; an outer cylindrical member having a cylindrical opening located generally at its center for holding said radiation shielding cylindrical member, said outer cylindrical member having a disk-like opening in the bottom thereof coaxial with the radiation shielding cylindrical member; a disk member composed of radiation shielding material overlaying the radiation shielding material overlaying the radiation shielding member and the outer cylindrical member, said disk member having an opening therein concentric and coextensive with the opening in the radiation shielding member; and a plug member, said plug member having a disk portion arranged for engagement with the disk-like opening in the bottom of the outer cylindrical member and a depending portion arranged for engagement with the well of a scintillation counter, said adapter providing a defined geometry above the well of the scintillation counter for measurement therein of the activity of radioactive material.

4. An adapter in accordance with claim 3 in which the radiation shielding cylindrical member and the disk member are composed of a substantially lead composition.

References Cited

UNITED STATES PATENTS

| | | | |
|---|---|---|---|
| 2,857,524 | 10/1958 | Tabern et al. | 250—106 |
| 3,115,577 | 12/1963 | Joffe et al. | 250—106 |

RALPH G. NILSON, *Primary Examiner.*

S. ELBAUM, *Assistant Examiner.*